US006920576B2

United States Patent
Ehmann

(10) Patent No.: US 6,920,576 B2
(45) Date of Patent: Jul. 19, 2005

(54) PARALLEL DATA COMMUNICATION HAVING MULTIPLE SYNC CODES

(75) Inventor: Gregory E. Ehmann, Sleepy Hollow, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 646 days.

(21) Appl. No.: 09/871,117

(22) Filed: May 31, 2001

(65) Prior Publication Data

US 2002/0184549 A1 Dec. 5, 2002

(51) Int. Cl.$^7$ .............................. G06F 1/12; G06F 11/00
(52) U.S. Cl. ..................... 713/400; 713/600; 714/707
(58) Field of Search ................... 713/400, 600, 713/500; 714/700, 707; 375/371, 362

(56) References Cited

U.S. PATENT DOCUMENTS

| 5,978,419 | A | * | 11/1999 | Cassiday et al. | ............ | 375/257 |
| 6,079,035 | A | * | 6/2000 | Suzuki et al. | ............... | 714/700 |
| 6,725,388 | B1 | * | 4/2004 | Susnow | ...................... | 713/400 |

FOREIGN PATENT DOCUMENTS

JP   11074945 A   * 3/1999   .......... H04L/29/00

OTHER PUBLICATIONS

IBM, Enhanced Means for Parallel Synchronization in Crossbar Switching Networks, Jun. 1, 1989, vol. 32, Issue 1, pp. 281–283.*

* cited by examiner

Primary Examiner—Thomas Lee
Assistant Examiner—Suresh K Suryawanshi
(74) Attorney, Agent, or Firm—Michael J. Ure

(57) ABSTRACT

A high-speed parallel-data communication approach overcomes skewing problems by transferring digital data with automatic realignment. In one example embodiment, a parallel bus has parallel bus lines adapted to transfer digital data from a data file, along with a synchronizing clock signal. To calibrate the synchronization, the sending module transfers synchronization codes which are sampled and validated according to an edge of the clock signal by a receiving module and then used to time-adjust the edge of the clock signal relative to the synchronization codes. The synchronization codes are implemented to toggle the bus lines with each of the synchronization codes transferred.

21 Claims, 6 Drawing Sheets

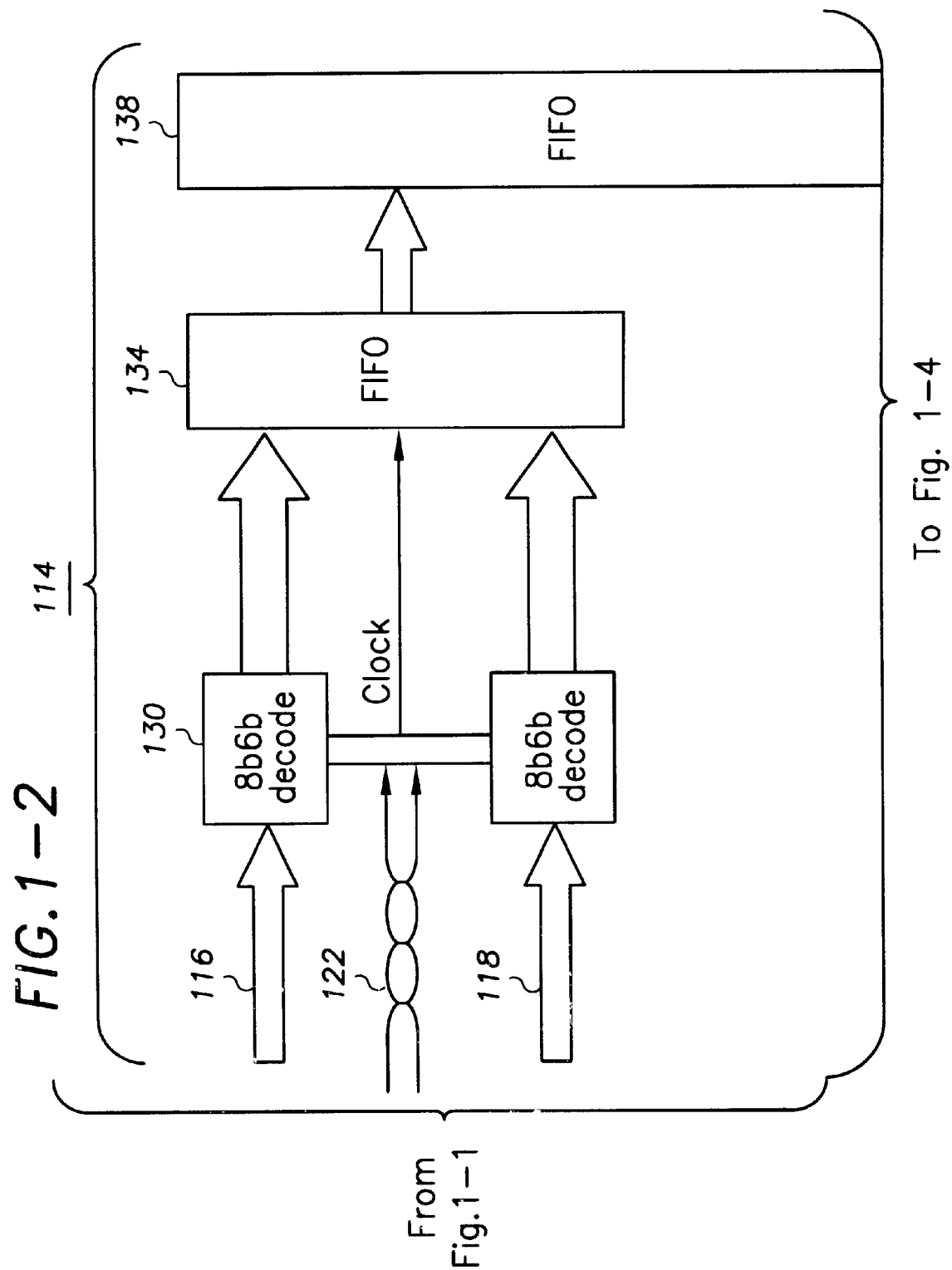

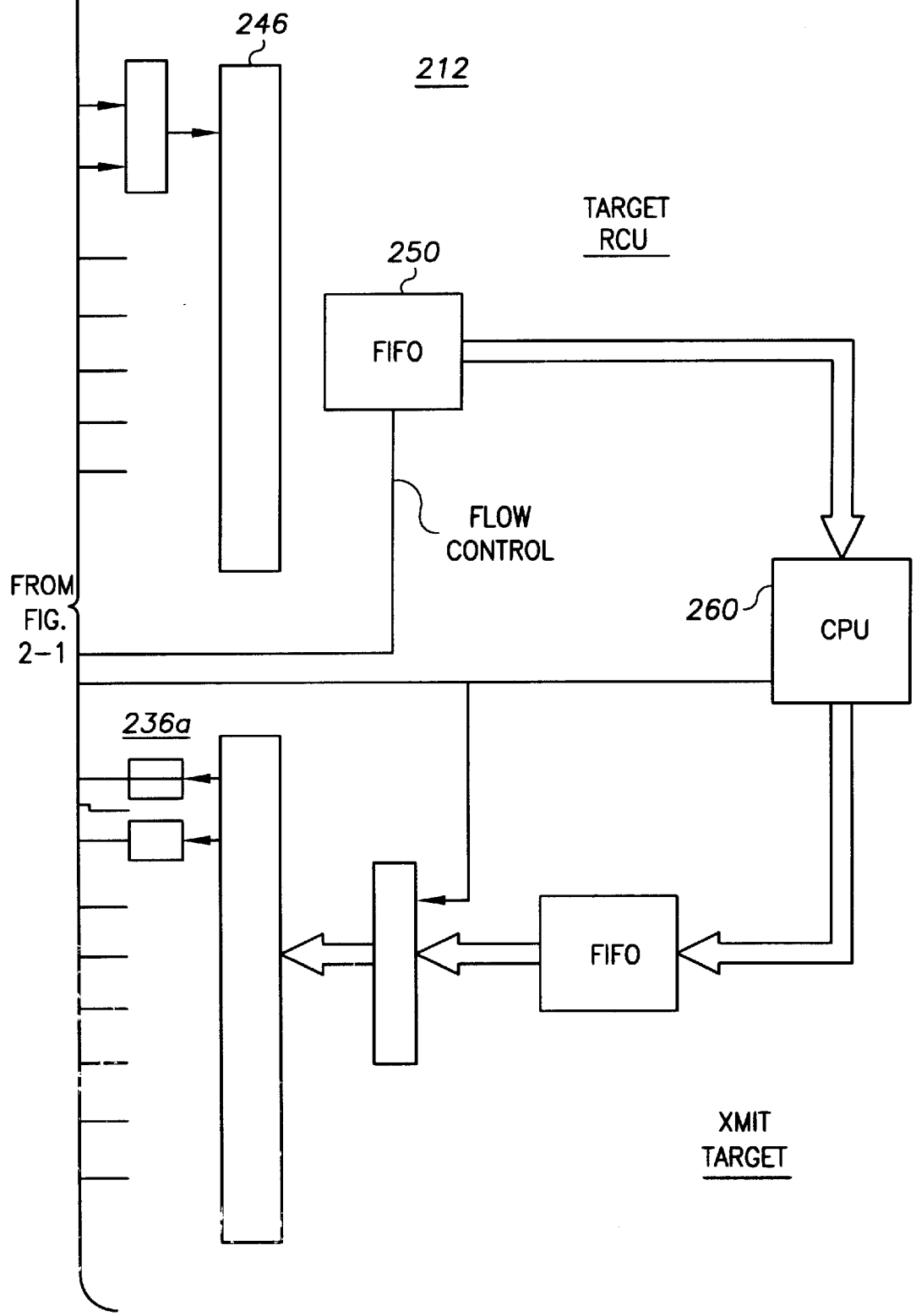

PARALLEL DATA COMMUNICATION HAVING MULTIPLE SYNC CODES

RELATED PATENT DOCUMENTS

The present invention is related to and fully incorporates the subject matter disclosed in concurrently-filed U.S. patent application, Ser. No. 09/871,197, entitled "Parrallel Communication Based on Balanced Data-Bit Encoding" (now U.S. Pat. No. 6,636,166), Ser. No. 09/871,160 entitled "Parallel Data Communication Consuming Low Power," and Ser. No. 09/871,159, entitled "Parallel Data communication Having Skew Intolerant Data Groups."

FIELD OF THE INVENTION

The present invention is directed generally to data communication. More particularly, the present invention relates to methods and arrangements for synchronizing data passed on a parallel data bus that is susceptible to skew-caused errors.

BACKGROUND OF THE INVENTION

The electronics industry continues to strive for high-performance, high-functioning circuits. Significant achievements in this regard have been realized through the development of very large-scale integrated circuits. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces that are designed to ensure that data integrity is maintained while using circuit designs are sensitive to practicable limitations in terms of implementation space and available operating power.

The increased demand for high-performance, high-functioning semiconductor devices has lead to an ever-increasing demand for increasing the speed at which data is passed between the circuit blocks. Many of these high-speed communication applications can be implemented using parallel data transmission in which multiple data bits are simultaneously sent across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel), for example, in the form of a cable, a backplane circuit, a bus structure internal to a chip, other interconnect, or any combination of such communication media. A sending module transmits data over the bus synchronously with a clock on the sending module. In this manner, the transitions on the parallel signal lines leave the sending module in a synchronous relationship with each other and/or to a clock on the sending module. At the other end of the parallel data interconnect, the receiving module receives the data on the parallel data bus; where the communication arrangement passes a clock signal, the receive clock is typically derived from or is synchronous with the clock on the sending module. The rate at which the data is passed over the parallel signal lines is sometimes referred to as the (parallel) "bus rate."

In such systems, it is beneficial to ensure that the received signals (and where applicable, the receive clock) has a specific phase relationship to the transmit clock to provide proper data recovery. There is often an anticipated amount of time "skew" between the transmitted data signals themselves and between the data signals and the receive clock at the destination. There are many sources of skew including, for example, transmission delays introduced by the capacitive and inductive loading of the signal lines of the parallel interconnect, variations in the I/O (input/output) driver source, intersymbol interference and variations in the transmission lines' impedance and length. Regardless of which phenomena cause the skew, achieving communication with proper data recovery, for many applications, should take this issue into account.

For parallel interconnects serving higher-speed applications, in connection herewith, it has been discovered that skew is "pattern dependent" and that the severity of this issue can be mitigated and, in many instances, largely overcome. As described in the above-referenced patent document entitled "Parallel Communication Based on Balanced Data-Bit Encoding," this pattern dependency results from the imperfect current sources shared between the data bits in the parallel bus. The shared current sources induce skew at the driver, which directly reduces margin at the receiver, which in turn can cause data transmission errors.

Many of these high-speed parallel communication applications require the parallel transmission of many bits of data and, therefore require the use of a corresponding number of parallel-bus data lines. Typically, the greater the number of data bits (or parallel-bus data lines), the more difficult it is to prevent unacceptable levels of skew across all the bits. With increasing transmission rates, this difficulty is a bottleneck to the number of useful parallel-bus data lines.

Conventionally, this skew problem is addressed by manually adjusting delays in each line. The delays are adjusted so that the data appears as though it has arrived at the receiving end of the bus at the same time. For many applications, controlling the skew problem in this manner is unduly tedious and/or costly. The burdens associated with this approach are significantly increased where the application multiple

SUMMARY OF THE INVENTION

Various aspects of the present invention are directed to data transfer over parallel-communication line circuits in a manner that addresses and overcomes the above-mentioned issues and can be used in conjunction with the embodiments disclosed in the above-mentioned patent documents. One aspect of the invention is directed to a high-speed parallel-data communication approach that overcomes skewing problems by transferring digital data with automatic realignment. Parallel bus lines transfer digital data, along with a synchronizing clock signal, from a first module to a second module. To calibrate the synchronization, the first module transfers bus-toggling synchronization codes that are sampled and validated according to an edge of the clock signal by the second module and then used to time-adjust the edge of the clock signal relative to the sampled synchronization codes.

Consistent with another, more particular example embodiment, the present invention is directed to a parallel data communication arrangement in which the parallel bus lines are arranged in a plurality of groups wherein each group includes a plurality of data-carrying lines and a clock path adapted to carry a clock signal for synchronizing digital data carried over the plurality of data-carrying lines of the group. At the sending end, a first module separates portions of data from the data file into separate sets of data, and transfers the sets of data concurrently on the plurality of groups of bus lines along with the clock signals for the respective groups. The sets of data include synchronization codes for the receiving end. At the receiving end, a second module collects, for each group, the sets of data according to timing defined as a function of the clock signal received for the group, and searches for the synchronization codes. In response to these synchronization codes, the timing is adjusted and the data collected for each group is aligned with the clock signal received for the group.

In another more specific embodiment, the clock signal for each group is differential and is used to synchronize the reception of two sets of encoded multiple-bit data values at the receiver circuit. In addition, the second module and the time-adjustment circuit act to center the clock edge relative to the sampled digital data.

Another aspect of the invention involves an approach for incrementally adjusting the edge of the clock signal relative to the synchronization codes. The adjustment circuit causes the synchronization codes to be moved relative to the clock until they are missampled, the edge of the clock signal relative to the synchronization codes is adjusted before and after the synchronization codes are missampled by the second module. Optionally, the adjusting continues until the edge of the clock signal relative to the synchronization codes is centered.

Other example embodiments of the present invention are respectively directed to related structure, methodology and system-processing aspects of such communication environments.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1-1 through 1-4, is a diagram of an example parallel data communication arrangement in which digital data is transferred in parallel from a first module to a second module over a communication channel including a plurality of parallel data-carrying lines, according to the present invention; and FIG. 2, including FIGS. 2-1 and 2-2, is a diagram of another example parallel data communication line arrangement, also according to the present invention.

Figure 1:
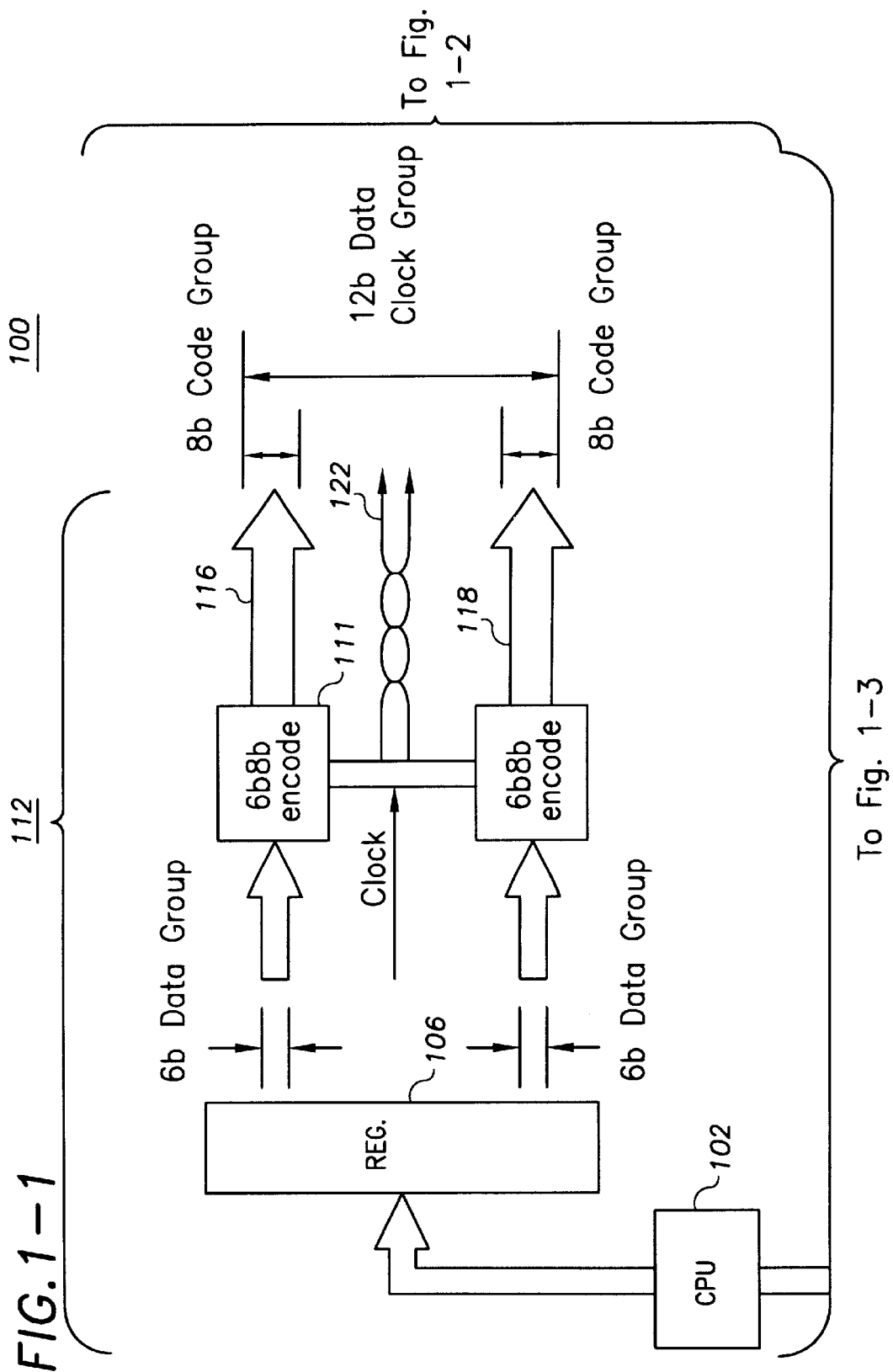
FIG. 1, including

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EXAMPLE EMBODIMENTS

The present invention is believed to be generally applicable to methods and arrangements for transferring data between two modules (functional blocks) intercoupled by a parallel data communication path. The invention has been found to be particularly advantageous for high-speed data transfer applications susceptible to data-skew errors. Examples of such application include, among others, SSTLS (stub series transceiver/terminated logic), RSL (Ranabus Signaling Logic) interfaces, closely-connected applications such as where the parallel data communication path communicatively couples the two modules on a single-chip, off-board high-speed communication between chips typically situated immediately adjacent each other on the same printed circuit board such as on a reference-chip development platform of the type disclosed in U.S. patent application Ser. No. 09/215,942, filed on Dec. 18, 1998, now U.S. Pat. No. 6,347,395. While the present invention is not necessarily limited to such applications, an appreciation of various aspects of the invention is best gained through a discussion of examples in such an environment.

An example application of the present invention involves a parallel data communication arrangement that passes digital data on a parallel source-synchronous data bus between a pair of circuit modules, referred to as a sending (or first) module and a receiving (or second) module. The clock is transmitted along with the data to the receiving module for data synchronization, with one edge (rising or falling) of the clock being used to latch the data into a latching circuit (e.g., latch, buffer or small FIFO) at the receiving module. However, because the data sent over the bus is susceptible to data skewing (as discussed previously), the edge (rising or falling) of the clock is assumed to be exactly coincident with the latched data or 90 degrees out of phase. Since the receiver is assuming that the relationship between the clock and data are well defined, it is important that this relationship between the clock edge and received data be true. The parallel data includes synchronization codes that are specially selected to cause the bus lines to toggle between digital states when sent immediately after one another. This toggling action is used to provide a transition point for each data line relative to an edge of the clock signal. This approach ensures that any skew-caused misalignments can be adjusted to within one half clock period. For further information regarding application of such synchronization codes reference may be made to the above-reference patent document entitled, "Parallel Communication Based On Balanced Data-Bit Encoding", which provides an example 6b8b coding approach in which only 64 of the available 256 8b codes are used for transmission over 8 bits of parallel data, and in which selected balanced codes, e.g., 0×33 & 0×CC, or 0×C3 & 0×3C (in hexidecimal), are assigned as synchronization codes, and are selectively used so that two of the synchronization codes are repeatedly and contiguously sent during the calibration process of the present invention. Advantageously, using this coding approach permits data-value validation for both synchronization codes and non-special data values by simply programming the CPU at the receiving end to match the sampled data with the codes used (versus the unused codes) in the 6b8b approach. For further information regarding a compatible encoding/decoding communication approach generally, reference may be made to each of the above-reference patent documents.

In a particular example implementation of the invention corresponding but not limited to the above-mentioned 6b8b approach, the source-synchronous data bus has the bus lines arranged in a plurality of groups, with each group including data-carrying lines and a clock path adapted to carry the clock signal for that particular group. At the sending end, the first module separates portions of data from the data file into separate sets of data, and repeatedly transfers the sets of data concurrently on the plurality of groups of bus lines along with the clock signals for the respective groups. The synchronization codes are sent for each clocked group; thus, for an eight bit wide bus-line group, one synchronization code would be eight bits wide. Using the above example, one synchronization code is 33 (hexidecimal) and another is CC (hexidecimal).

At the receiving end, a second module collects, for each group, the sets of data according to timing defined as a function of the clock signal received for the group, and attempts to validate the synchronization codes. In response to these synchronization codes, delay circuits at the sending and/or receiving module (typically interfacing in or to each data line of the parallel bus) are activated and deactivated, in response to a feedback line, to adjust the timing of the data collected relative to the clock edge in each group. Ideally, the timing is adjusted so that the data is centered at the clock edge. The delay circuits can be implemented using various conventional approaches including, for example, logic circuits/paths arranged to provide selectable signal-passing delays, and MOS transistors having fixed current-passing activation times.

According to a more specific implementation of the present invention, this ideal centered-timing relationship is achieved by first sending, receiving and validating the synchronization codes, and then incrementally adjusting the timing until the data is missampled (i.e., when the received data cannot be validated) at the receiving end. Once this missampling occurs, the timing is incrementally adjusted in the opposite direction (lead versus lag) while tracking each incremental adjustment until the timing adjustment causes missampling to occur in this opposite direction. The tracking is then used to back-adjust the timing to the increment corresponding to the halfway point in the spectrum from the first missampling to the second missampling, and thereby centering the clock edge with the data on each line. With feedback from the second module and coupling of this information to the date-line adjustment circuitry, such data processing can, of course, be implemented using a programmed processor at one or both ends of the parallel bus and/or using a hardware state machine.

The present invention also contemplates certain applications that permit less-than-ideal calibration and, in such implementations, this ideal centered-timing relationship is compromised to a certain degree to minimize the steps (and associated interruptions to overall communications) required to achieve the ideal centered-timing relationship. In such applications, the extent to which the ideal centered-timing relationship is compromised depends on the particular application and the tolerance for error.

FIGS. 1-1 through 1-4 illustrate a parallel-data communication line arrangement 100, according to another example embodiment of the present invention. The arrangement 100 includes a differential clock that is used to define the rate at which the data is synchronously passed between from a processing circuit, such as CPU 102 and registers 106, at sending module 112 to a receiving module 114. The skilled artisan will appreciate that a differential clock is not required for all applications, and that although FIGS. 1-1 through 1-4 illustrate the data being passed in only one direction, reciprocal communication can also be provided with each of the modules 112 and 114 being part of a respective communication node including the reciprocal set of transmit and receive circuits.

The arrangement 100 uses a data-value encoding-decoding approach in which data values are encoded by circuit 111 and then passed, from the sending module 112 to the receiving module 114, using parallel data lines 116 and 118 along with clock lines 122. The clock lines 122 are used to provide the communication rate and synchronization timing between sending and receiving modules 112 and 114. At the receiving module 114, a processor or other decode circuit 130 uses a reciprocal coding algorithm, lookup table or equivalent circuit to decode the data value back to its pre-encoded data value.

The arrangement 112 is directed to an example application involving two clock domains, each domain defined by a clock signal for synchronizing communication for a 12-bit data clock (12b DC) group corresponding to a pair of 6-bit code ("6b") groups encoded as a pair of 8-bit code ("8b") groups on bus lines 116 and 118, as discussed in connection with the above-mentioned patent document. The first and second clock domains are respectively labeled using the same base reference numeral with the second clock domain circuitry followed by an apostrophe; for example, the differential clock of the first clock domain is denoted 122 whereas the differential clock of the second clock domain is denoted 122'. The 12b DC groups efficiently encode communications of data or commands of 12 signals. In some cases, it may be advantageous to use smaller groups. Thus, as illustrated, a 12b DC group includes a differential clock pair and two 6b8b encodes, for a total of 18 pins between the sending module 112 and the receiving module 114. For each clock domain, one half of the 12b DC group includes one 6b8b encoder and a differential clock pair, for a total of 10 pins. Un-encoded differential pairs can also be used to transport signals. These differential pairs can share the clock signal used with one half of a 12b DC group, or the differential pairs can have their own clock pair.

Data in each of the code groups are synchronously received at the receiving module 114, where a data processing circuit, or in this instance an 8b6b decoder circuit 130, converts the synchronously received sets of 8-bit wide data into corresponding sets of 6-bit wide data values and then stores the 6-bit wide data values into a FIFO buffer 134 dedicated to the clock domain defined by the differential clock signal 122. Thus, for each clock domain there is one FIFO buffer immediately following a pair of 8b6b decoder circuits.

At circuit startup or optionally, periodically after startup, data in each code group is calibrated to the center of the clock edge used to sample the data from the bus into the receiving module (e.g., from 112 to 114). Using synchronization codes that cause the bus lines to toggle between digital states when sent immediately after one another, this calibration can be achieved as described above for the centered-timing relationship. With this centering approach used to minimize any skew-caused misalignments, the data in the FIFO buffer FIGS. 1-1 though 1-4 for each clock domain will not have any skew-caused misalignments.

When FIFO 134 and FIFO 134' are not empty, the data from both are transferred to a larger FIFO 138, which is sufficiently wide to accept the data from both clock domains. A post-processor the reads this data and removes any skew-caused misalignments between the various groups, as is described in the above-referenced patent document entitled, "Parallel Data Communication Having Skew Intolerant Data Groups".

Figures 1, 2, 3:
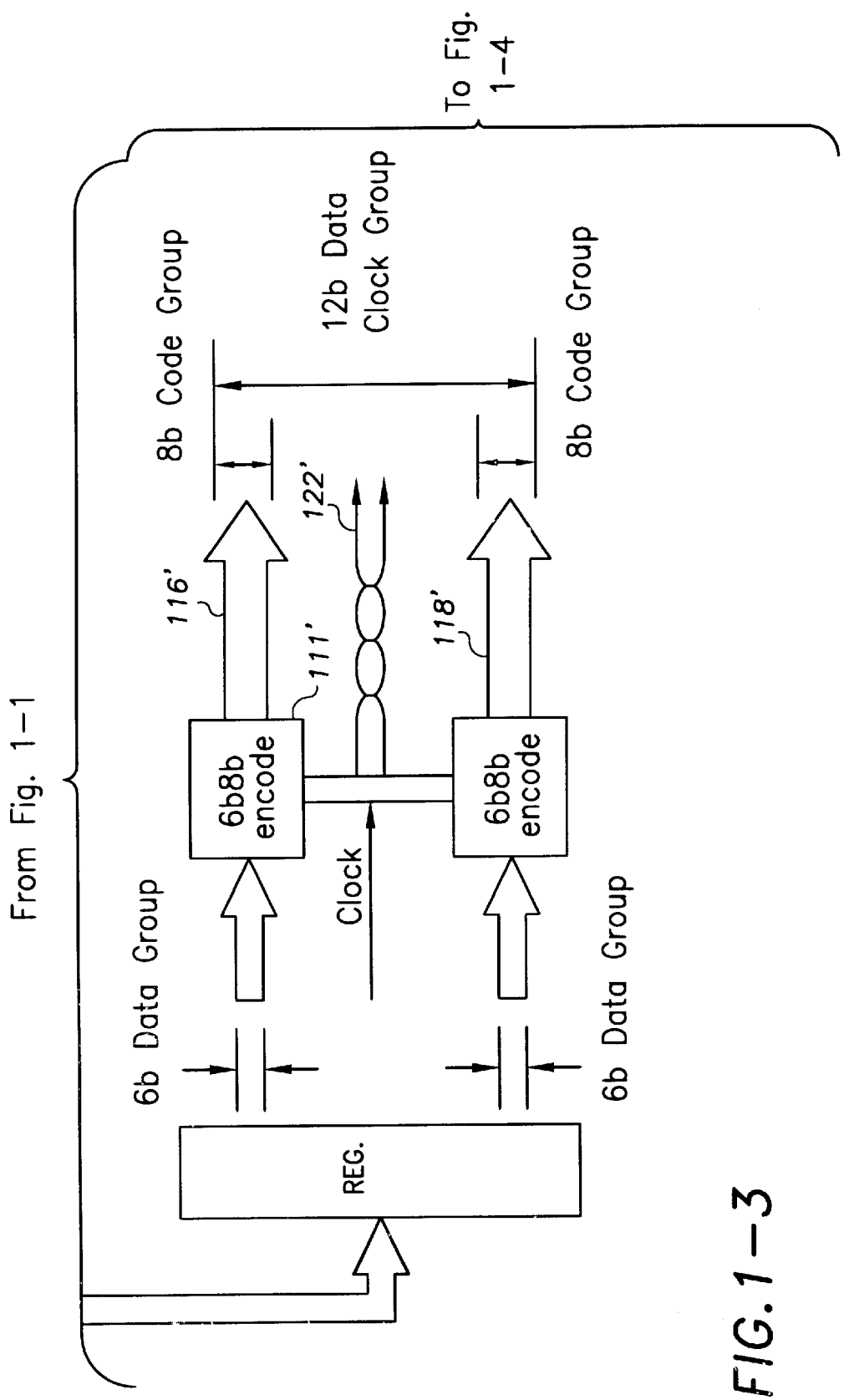
Figures 1, 2, 3, 4:
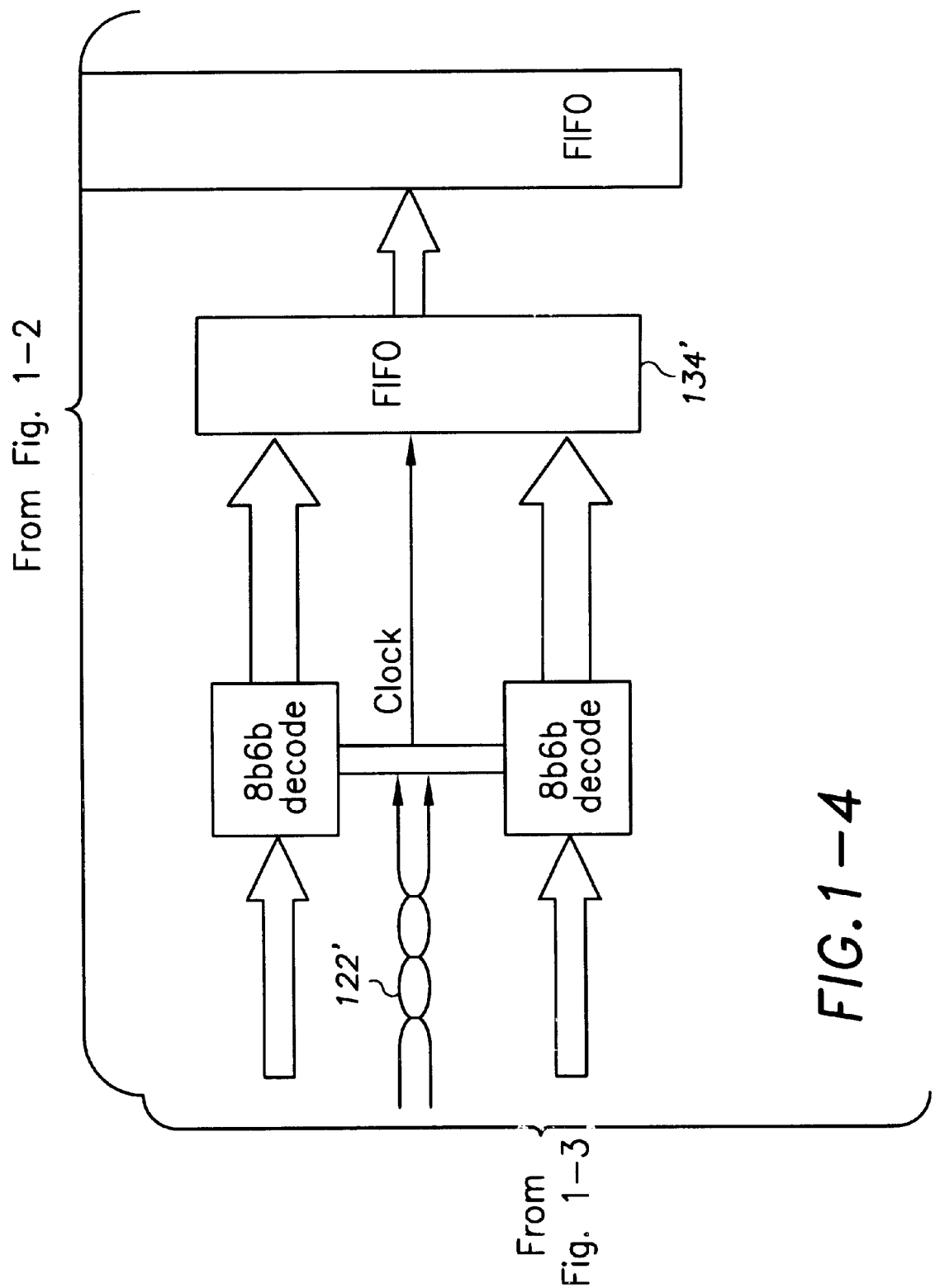
Figures 1, 2:
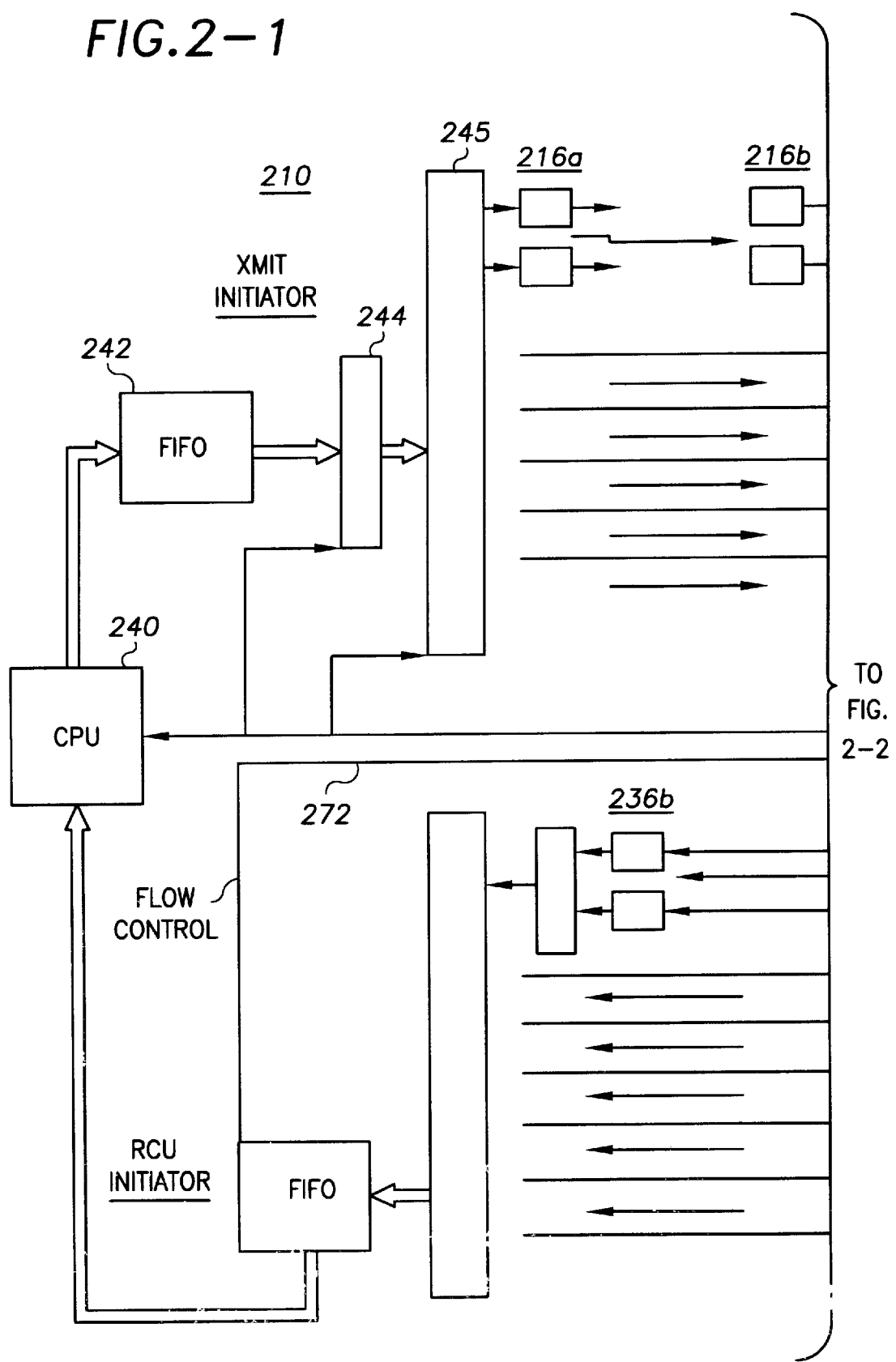

Also according to the present invention, another embodiment uses a subset of the circuitry shown in FIGS. 2-1 and 2-2. This embodiment does not require that the bus lines be arranged in a plurality of groups with transferred data separated among the groups. Rather, the data is sent in its entirety using only one clock signal. In this application of the present invention, the CPU 102 effectively operates on the data for only one of the clock domains.

FIGS. 2-1 and 2-2 illustrate another implementation of the present invention in which six of the same types of encode/decode clock domain circuits of FIGS. 1-1 through 1-4 are used in each of two communication paths for communication in each respective direction. For passing communications initiated at a first terminal 210 for reception at the second terminal 212, one of the six identical clock domain circuits is depicted by connected circuits 216*a* and 216*b*. For communications initiated at the second terminal 212 for reception at the first terminal 210, six additional encode/decode clock domain circuits of this type are used; one of these circuits is depicted by connected circuits 236*a* and 236*b*. Forte sake of brevity, the following discussion is limited to the communication flow initiated at the first terminal 210 for reception at the second terminal 212.

Communications initiated at a first terminal 210 begin at CPU 240, or another source, which feeds target data, along with any desired status or control data, to a front-end FIFO 242. From the FIFO 242, the data is formatted for communication at flow-control buffer 244 for presentation to the six sets of encode/decode clock domain circuits (depicted as 245); thus, the encode/decode clock domain circuits receive data that is 72 bits wide (twelve bits for each of the six domain circuits). After 6b8b encoding, the data is transmitted to and decoded at the second terminal 212 through delay-time adjustment circuitry built into bus drivers and/or bus receivers, also depicted as circuits 216*a* and 216*b*. The delay-time adjustment circuitry can be controlled using signals (not shown) from the CPU 240 or another interface in response to the feedback provided by the second terminal 212; alternatively, the feedback can be locally controlled by using only the bus receiver, depicted as circuit 216*b*. Once decoded, the data is presented to the wide FIFO 246 and, with skew-caused misalignments being corrected within each clock domain as previously discussed, the data is then packed into a FIFO 250 for processing by the second terminal CPU 260.

Also illustrated in FIGS. 2-1 and 2-2 are flow-control communication paths 270 and 272. These paths 270 and 272 are used to provide status information back to the initiating terminal 210 or 212, including feedback information for controlling delay-time adjustment circuitry of FIGS. 2-1 and 2-2. Various other types of communication status information can be provided depending on the application; examples include whether the FIFO is filled less than a lower threshold level, whether the FIFO is filled more than an upper threshold level, whether the FIFO is empty, whether the PIED is full, whether an error has occurred due, for example, to the FIFO overflowing or invalid data being drawn from the FIFO. Such flow control is conventional and used in many communication schemes.

For further information regarding details or variations to either FIGS. 1-1 through 1-4 or FIGS. 2-1 and 2-2, reference may be made to the above-referenced patent document entitled, "Parallel Data Communication Having Skew Intolerant Data Groups".

Accordingly, various embodiments have been described as example implementations of the present invention for addressing skew issues in parallel bus applications. However, the present invention should not be considered limited to the particular examples described above. Various modifications, equivalent processes, as well as numerous structures to which the present invention may be applicable fall within the scope of the present invention. For example, multi-chip or single-chip arrangements can be implemented using a similarly constructed one-way or two-way interface for communication between the chip-set arrangements. It will also be appreciated that at the receiving module, the data can be sampled using the rising edge, the falling edge or both edges of the clock during the calibration process and/or during normal data communications. Such variations may be considered as part of the claimed invention, as fairly set forth in the appended claims.

What is claimed is:

1. A parallel data communication arrangement susceptible to skewing digital data, comprising:
    a parallel bus having parallel bus lines adapted to transfer digital data and having a clock path adapted to carry a clock signal for synchronizing digital data carried over the plurality of data-carrying lines;
    a first module adapted to transfer the digital data concurrently on the bus lines along with the clock signal, selected ones of the sets of data including at least two synchronization codes transferred on the bus lines to toggle the bus lines with each of the synchronization codes transferred;
    a second module adapted to
        sample the synchronization codes in response to an edge of the clock signal, and
        validate the sampled synchronization codes; and
    an adjustable data-delay circuit responsive to the validated synchronization codes and adapted to adjust the edge of the clock signal relative to the synchronization codes.

2. The parallel data communication arrangement of claim 1, wherein the adjustable data-delay circuit is further adapted to adjust the edge of the clock signal relative to the synchronization codes by causing the synchronization codes to be missampled by the second module.

3. The parallel data communication arrangement of claim 2, wherein the adjustable data-delay circuit is further adapted to repeatedly adjust the edge of the clock signal relative to the synchronization codes.

4. The parallel data communication arrangement of claim 1, wherein the adjustable data-delay circuit is further adapted to adjust the edge of the clock signal relative to the synchronization codes by causing the synchronization codes to be missampled by the second module, and wherein the edge of the clock signal relative to the synchronization codes is adjusted before and after the synchronization codes are missampled by the second module.

5. The parallel data communication arrangement of claim 1, wherein the adjustable data-delay circuit is part of the parallel bus.

6. The parallel data communication arrangement of claim 1, wherein the adjustable data-delay circuit is part of the first module.

7. The parallel data communication arrangement of claim 1, wherein the adjustable data-delay circuit is part of the second module.

8. The parallel data communication arrangement of claim 1, wherein the adjustable data-delay circuit is part of the first and second modules.

9. The parallel data communication arrangement of claim 1, wherein the synchronization codes are not used to represent data values sent over the bus.

10. The parallel data communication arrangement of claim 1, wherein the clock path is implemented using a pair of the parallel bus lines adapted to carry the clock signal as a differential signal.

11. The parallel data communication arrangement of claim 1, wherein the second module is further adapted to tolerate any skew-caused misalignments not exceeding one half of a period of the clock signal.

12. The parallel data communication arrangement of claim 1, wherein the data transferred over the parallel bus is converted from a first data value to a second data value that consists of a greater number of bits.

13. The parallel data communication arrangement of claim 12, wherein the first module includes an encoder and the second module includes a decoder.

14. The parallel data communication arrangement of claim 13, wherein the encoder converts a 6-bit value to an 8-bit value, and wherein the decoder converts an 8-bit value to a 6-bit value.

15. The parallel data communication arrangement of claim 1, wherein the adjustable data-delay circuit is used to center the edge of the clock signal relative to the sampled synchronization codes.

16. A parallel data communication arrangement susceptible to skewing digital data, comprising:
a parallel bus having parallel bus lines adapted to transfer digital data and having a clock path adapted to carry a clock signal for synchronizing digital data carried over the plurality of data-carrying lines;
first means for transferring the digital data concurrently on the bus lines along with the clock signal, selected ones of the sets of data including at least two synchronization codes transferred on the bus lines to toggle the bus lines with each of the synchronization codes transferred;
second means for
sampling the synchronization codes in response to an edge of the clock signal, and
validating the sampled synchronization codes; and
means, responsive to the validated synchronization codes, for time-adjusting the edge of the clock signal relative to the synchronization codes.

17. A parallel data communication method susceptible to skewing digital data, the method comprising:
over a parallel bus having parallel bus lines and a clock path adapted to carry a clock signal for synchronizing digital data carried over the plurality of data-carrying lines, transferring the digital data concurrently along with the clock signal, selected ones of the sets of data including at least two synchronization codes to toggle the bus lines with each of the synchronization codes transferred;
receiving the transferred data, including
sampling the synchronization codes in response to an edge of the clock signal, and
validating the sampled synchronization codes; and
responsive to the validated synchronization codes, time-adjusting the edge of the clock signal relative to the synchronization codes.

18. The method of claim 17, further including adjusting the edge of the clock signal relative to the synchronization codes by causing the synchronization codes to be missampled.

19. The method of claim 18, wherein the edge of the clock signal relative to the synchronization codes is adjusted before and after the synchronization codes are missampled.

20. A parallel data communication arrangement susceptible to skewing data, comprising:
a parallel bus having parallel bus lines adapted to transfer digital data from a data file, the parallel bus lines being arranged in a plurality of groups wherein each group includes a plurality of data-carrying lines and a clock path adapted to carry a clock signal for synchronizing digital data carried over the plurality of data-carrying lines of the group;
a first module adapted to
separate portions of data from the data file into separate sets of data, and
repeatedly transfer the sets of data concurrently on the plurality of groups of bus lines along with the clock signals for the respective groups, selected ones of the sets of data including synchronization codes that are used to toggle the bus lines; and
a second module adapted to collect, for each group, the sets of data according to timing defined as a function of the clock signal received for the group, and further adapted to search for the synchronization codes and, in response thereto, to adjust the timing and therein align the data collected for each group with the clock signal received for the group.

21. The parallel data communication arrangement of claim 20, wherein the first and second modules are further adapted to process concurrent data to permit the second module to resolve, for each group, data carried by the plurality of data-carrying lines and the clock signal within a single clock period of the clock signal, and, between data concurrently transferred in different groups, to permit skew-caused misalignments that span multiple clock periods.

* * * * *